(12) United States Patent  (10) Patent No.: US 8,064,311 B2
Holbrook et al.  (45) Date of Patent: Nov. 22, 2011

(54) LENS CLEANER DISC

(75) Inventors: Paul Holbrook, Buffalo Grove, IL (US); Tony J. Abfall, Mount Prospect, IL (US); David M. Waskin, Arlington Heights, IL (US); Mark Brodie Williams, Moss Beach, CA (US)

(73) Assignee: Digital Innovations, LLC, Arlington Heights, IL (US)

( * ) Notice: Subject to any disclaimer, the term of this patent is extended or adjusted under 35 U.S.C. 154(b) by 552 days.

(21) Appl. No.: 12/234,301

(22) Filed: Sep. 19, 2008

(65) Prior Publication Data

US 2009/0073860 A1    Mar. 19, 2009

Related U.S. Application Data

(60) Provisional application No. 60/973,593, filed on Sep. 19, 2007.

(51) Int. Cl.
*G11B 3/58* (2006.01)
(52) U.S. Cl. .................. 369/71; 369/272.1; 720/671
(58) Field of Classification Search .............. 369/71, 369/272.1; 15/214, 250.22; 720/671
See application file for complete search history.

(56) References Cited

U.S. PATENT DOCUMENTS

| 4,456,019 A * | 6/1984 | Finamore ............... 132/201 |
| 5,040,160 A * | 8/1991 | Moriya ................... 369/71 |
| 5,117,411 A * | 5/1992 | Nakagawa ............... 369/72 |
| 5,499,228 A * | 3/1996 | Takeda ................... 369/71 |
| 2005/0055705 A1* | 3/2005 | Fritsch et al. ........... 720/671 |

* cited by examiner

*Primary Examiner* — Daniell L Negron
*Assistant Examiner* — Carlos E Garcia
(74) *Attorney, Agent, or Firm* — Clifford Kraft

(57) ABSTRACT

A cleaning disc for a media reading device having a laser lens. The cleaning disc includes a first surface configured to face the laser lens, a brush extending outwardly from the first surface, and a recess in the first surface configured to receive at least a portion of the brush when the brush contacts the laser lens during a cleaning operation. Each brush is defined by a strand of material that includes opposite ends. A first end of the material extends through a first aperture to define a first brush and a second end extends through a second, spaced apart aperture to define a second brush. A middle portion of the strand of material extends along a second surface of the cleaning disc between the first and second apertures, and is covered by a cover.

17 Claims, 5 Drawing Sheets

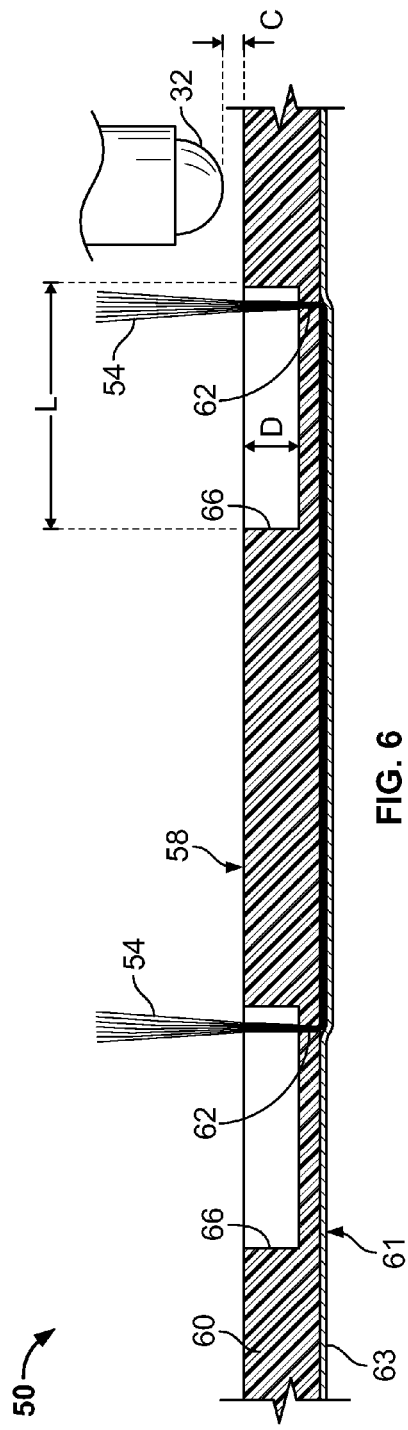
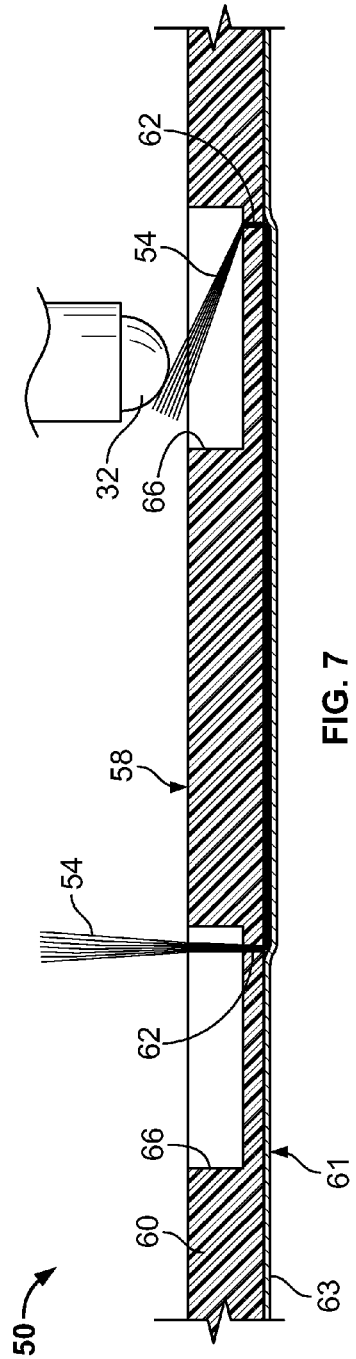

LENS CLEANER DISC

CROSS-REFERENCE TO RELATED APPLICATION

This application claims the benefit of U.S. Provisional Patent Application No. 60/973,593, filed Sep. 19, 2007, the entire contents of which are incorporated by reference herein.

FIELD OF THE INVENTION

The present invention relates to a lens cleaner disc for cleaning the lens of an optical media player or optical media reading or writing device.

BACKGROUND

Several types of media players exist in today's market place for reading and/or writing to various types of media discs. For example, reading and writing devices are known for reading from and writing to compact discs (CDs), digital video discs (DVDs), and other disc-based media formats. Each of these devices includes a laser lens for reading or writing electronic data on the media discs. Such laser lenses get dirty over time and require cleaning. Lens cleaning discs are insertable into the media player to clean the laser lens and may include one or more brushes that are configured to contact the laser lens as the disc rotates in the player. Cleaning disc brushes generally extend away from a surface of the disc that faces the laser lens and contact the laser lens when the disc is rotated by the device. The brushes thereby perform a wiping operation on the lens that cleans debris from the lens. In many instances, the brushes of the cleaning disc become pinched or jammed between the surface of the disc and the laser lens. This problem is notably prevalent in situations where the clearance between the disc and the laser lens is particularly small, such as in a high definition video disc player. Pinching and jamming of the brushes may scratch or otherwise damage the lens or the cleaning disc, or may prevent the disc from rotating, thereby reducing or altogether eliminating the ability of the cleaning disc to effectively clean the lens.

SUMMARY

In some aspects, a cleaning disc for a media reading device having a laser lens is provided. The cleaning disc includes a first surface configured to face the laser lens, a brush extending outwardly from the first surface, and a recess in the first surface configured to selectively receive at least a portion of the brush.

In other aspects, a cleaning disc for a media reading device having a laser lens is provided and includes a first surface configured to face the laser lens and defines a recess therein, and a brush extending outwardly from the first surface and being deflectable upon engagement with the laser lens, wherein at least a portion of the brush is receivable in the recess upon deflection of the brush.

In yet other aspects, a method of cleaning a laser lens of a media reading device is provided and includes inserting a cleaner disc into the media reading device, the cleaner disc including a brush protruding from the disc and a recess defined adjacent to the brush, operating the media reading device to rotate the cleaner disc, contacting the laser lens with the brush, and deflecting the brush at least partially into the recess.

BRIEF DESCRIPTION OF THE DRAWINGS

FIG. 6 is a partial cross-sectional view of the lens cleaner disc taken along line 4-4 of FIG. 3, the lens cleaner disc shown positioned relative to a laser lens of the media reading device.
FIG. 7 is a partial cross-sectional view of the lens cleaner disc similar to FIG. 6, shown with one of the brushes of the lens cleaner disc engaging the laser lens.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
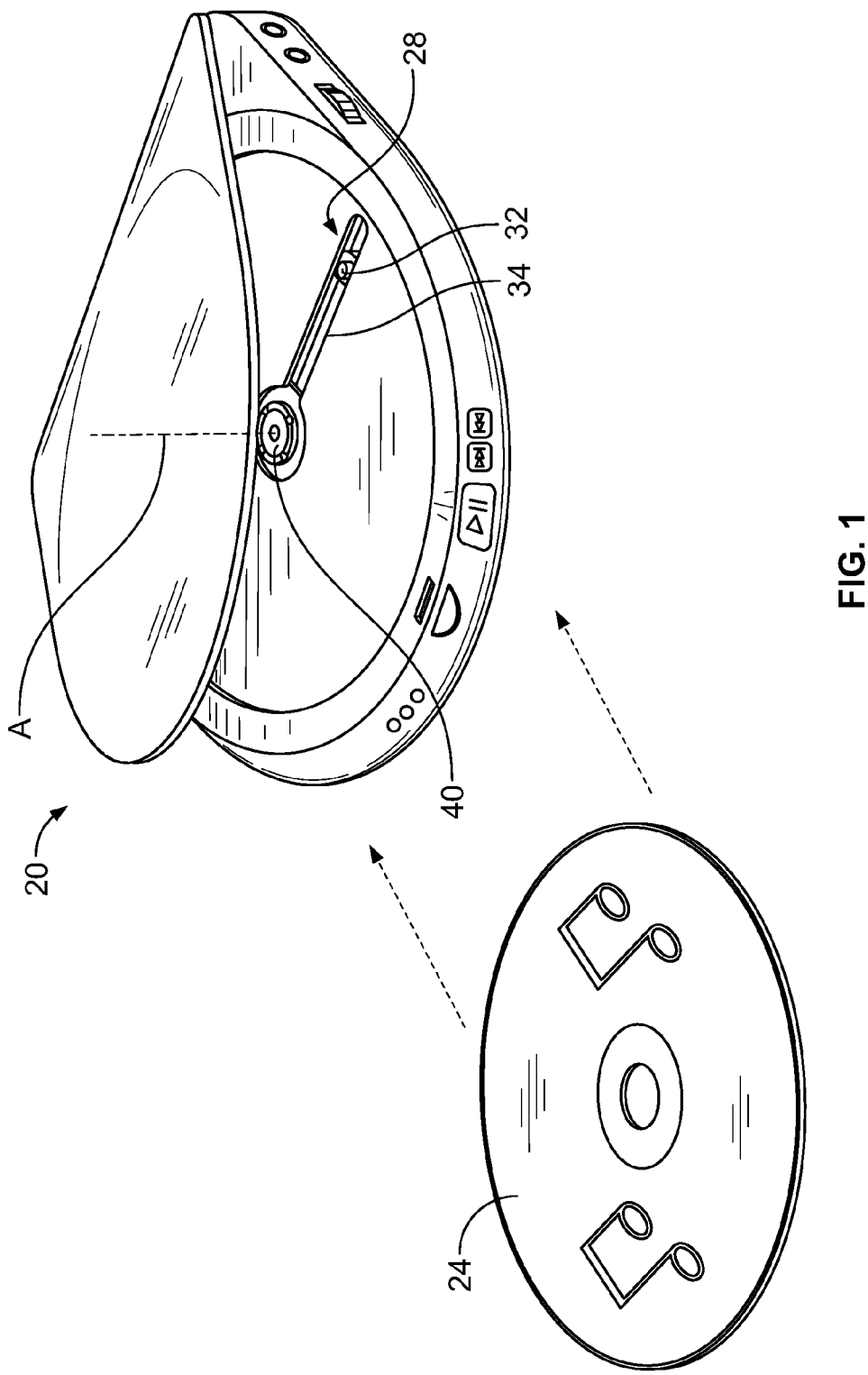
FIG. 1 is a perspective view of a media reading device and associated media disc.
Figure 2:
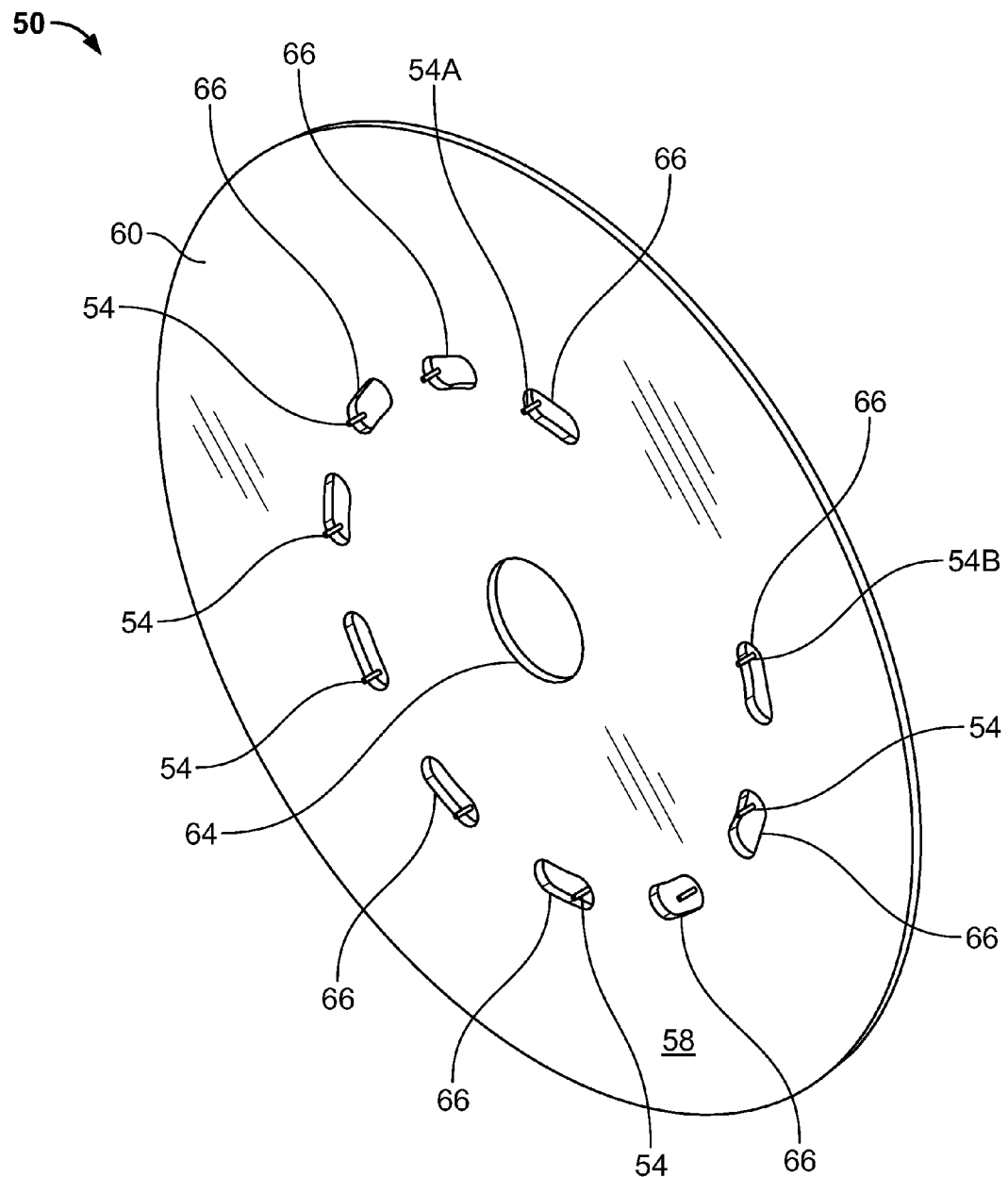
FIG. 2 is a perspective view of a lens cleaner disc.
Figure 3:
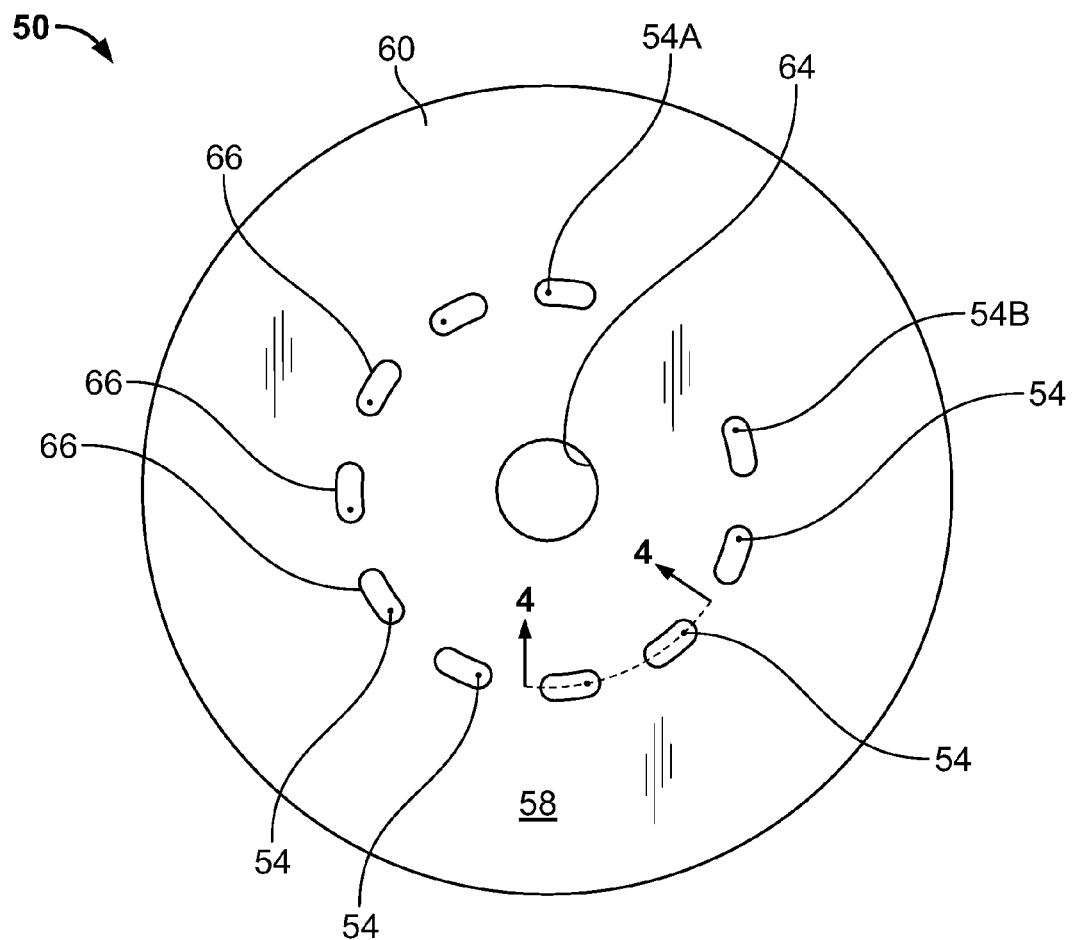
FIG. 3 is a bottom view of the lens cleaner disc of FIG. 2.

FIG. 1 illustrates a media player, media reading device, and/or media writing device (referred to hereinafter as the player 20) and a media disc 24 for use in the player 20. The illustrated player 20 is a portable compact disc "CD" player, but the invention is applicable to other media reading and/or writing devices such as, for example, digital video players ("DVD players") and the like. Also, the media disc 24 illustrated in FIG. 1 is an audio CD, but other types of media discs such as, for example, data CDs, CD-ROMs, digital video discs or "DVDs", or the like, may be read by the player 20. The player 20 receives the media disc 24 so that electronic media or data stored on the media disc 24 is readable by a reader assembly 28 of the player 20. The reader assembly 28 includes a non-contact reading element, such as a laser lens 32, which reads the electronic media or data stored on the media disc 24. The laser lens 32 is capable of moving along a path 34 to read the data stored at various locations on the disc 24. The player 20 is further operable to output a signal indicative of the stored media or data read from the media disc 24 to an output and/or storage device (e.g., a television, speakers, computer hard drive, etc.).

When the media disc 24 is in an operable position within the player 20, a small clearance is provided between the laser lens 32 and a surface (not shown) of the media disc 24 facing the laser lens 32. A motor (not shown) drives a spindle 40 of the player 20 about its axis A, and the media disc 24 rotates with the spindle 40 about the axis A (coincident with an axis of the media disc 24).

Over time, the laser lens 32 can become dirty, which can degrade the quality of the reading operation and/or prevent proper operation of the player 20. FIGS. 2-7 illustrate a lens cleaner disc 50, which is insertable into the player 20 to clean the laser lens 32. The lens cleaner disc 50 is shaped similarly to the media disc 24 of FIG. 1 which has a standardized size and shape. The lens cleaner disc 50 includes a substantially annular body 60 having first and second sides. A plurality of brushes 54 (FIGS. 2-4, 6, and 7) protrude outwardly from a first surface 58 that extends along the first side of the disc 50. In the illustrated construction, each brush 54 is formed of an array of bristles, however monofilament or unitarily formed brushes 54 may also be provided. When the cleaner disc 50 is inserted in the player 20, the first surface 58 faces the laser lens 32, and the bristles of the brush 54 extend from the first surface 58 toward the laser lens 32. In the illustrated embodiment, the disc 50 includes ten brushes 54 and each of the brushes 54 projects substantially perpendicularly from the first surface 58 of the lens cleaner disc 50. As shown most clearly in FIG. 3, the brushes 54 are arranged in a generally spiral array. The radial distance from the center of the lens cleaner disc 50 and also the circumferential spacing between adjacent brushes 54 increases from an innermost brush 54A towards an outermost brush 54B.

Figure 4:
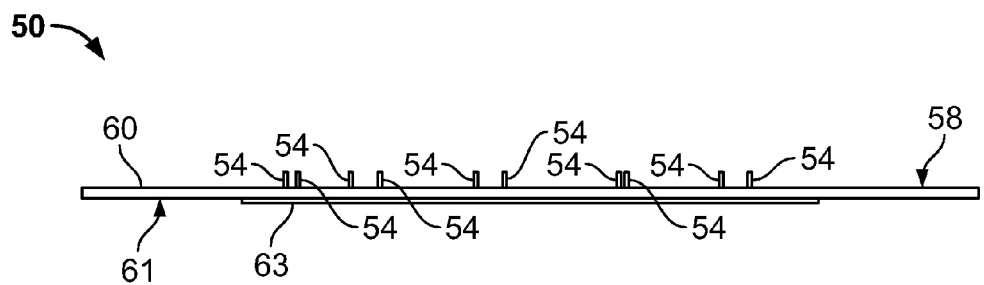
FIG. 4 is a side view of the lens cleaner disc of FIG. 2.
Figure 5:
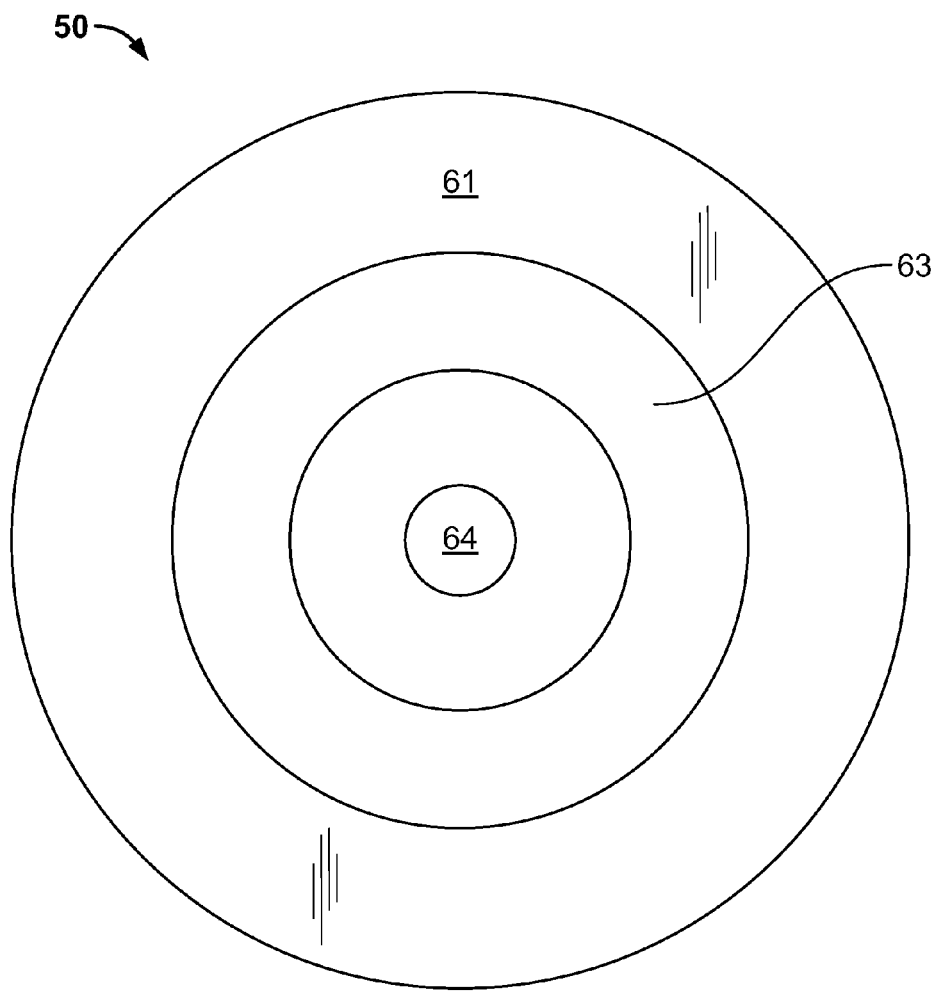
FIG. 5 is a top view of the lens cleaner disc of FIG. 2.

FIGS. 6 and 7 further illustrate one possible construction for mounting the brushes 54 of the lens cleaner disc 50. Two circumferentially adjacent brushes 54 are illustrated in FIG. 4. The material strands that form the bristles of both sets of brushes 54 are continuous and extend behind the body 60 of the lens cleaner disc 50 and along a second surface that faces in an opposite direction as the first surface 58 (e.g. away from the laser lens 32 when the cleaner disc 50 is inserted into the player 20). First ends of the material strands extend through and are snugly received by one of the apertures 62, and second, opposite ends of the material strands extend through and are snugly received by the other of the apertures 62. The apertures 62 normally hold the brushes 54 in substantially upright positions (e.g., extending substantially normal to the first surface 58) as shown in FIGS. 4 and 6. Middle portions of the material strands extend between the apertures 62 and along a second surface 61 of the body 60. A cover 63 overlies the middle portions of the material strands and holds the material strands against the body 60 of the lens cleaner disc 50. In the illustrated construction, the cover 63 is in the form of a felt ring that is adhesively coupled to the second surface 61 of the lens cleaner disc 50. Other suitable materials or constructions may also be utilized to hold the material strands of the brushes 54 in a substantially fixed orientation adjacent the second surface 61 of the lens cleaner disc 50. For example, materials other than felt may be used, and coupling methods other than adhesives may be used. Furthermore, in some constructions, the disc 50 may be molded over and/or around the material strands that form the brushes 54 such that the cover 63 and the body 60 are unitarily formed.

When inserted into the player 20, a central opening 64 of the lens cleaner disc 50 is fitted onto the spindle 40, and the lens cleaner disc 50 is rotated by the motor in a manner similar to that of the media disc 24 described above. As the lens cleaner disc 50 is rotated inside the player 20, the brushes 54 sequentially contact the outer surface of the laser lens 32 to thereby clean the laser lens 32. The lens cleaner disc 50 may store some electronic data (i.e., a "track") to provide at least one of an indication to a user regarding the status of the cleaning operation, an audio or visual instruction to the user, and/or instructions that direct the player 20 to move the laser lens 32 to different positions during the cleaning operation. The electronic data can also instruct the player 20 to rotate the lens cleaner disc 50 for a predetermined amount of time, predetermined number of rotations, etc., to sufficiently clean the laser lens 32.

As illustrated in FIGS. 2, 3, 6, and 7, the lens cleaner disc 50 includes a plurality of recesses 66, each of which is positioned adjacent a respective brush 54. In the illustrated construction, each recess 66 is positioned to substantially surround the respective brush 54, with a majority of the recess positioned to trail the brush 54 during rotation of the lens cleaner disc 50 in the player 20. Each recess 66 has a depth D and a length L (FIG. 6) sufficient to receive an entire brush 54 when the brush is deflected away from the upright position toward a folded position (see FIG. 7). The length L may be measured along an arc length when the recesses 66 extend along an arc concentric with the circumference of the lens cleaner disc 50 as illustrated. Alternatively, the recesses 66 can be straight (i.e., not defined along an arcuate path) and the length can be measured linearly.

The brushes 54 are preferably constructed of a material that does not damage the laser lens 32, and deflects upon contact therewith. For example, in one construction, the brushes 54 are made of polyester. Upon contact with the lens 32, the brushes 54 may deflect partially or fully into the recesses 66 (see FIG. 7). The amount of deflection of the brushes 54 depends not only upon the material of the brushes 54, but also upon a clearance distance C (FIG. 6) between the first surface 58 of the lens cleaner disc 50 and the laser lens 32. For example, a high definition video player, such as one that accepts BLU-RAY™ discs, may be configured to provide a very small clearance distance (e.g., 0.1 mm), thereby resulting in a greater degree of deflection of the brushes 54. Other high definition video players and standard definition video players may provide larger clearance distances (e.g., 1.0 mm), thereby resulting in a lesser degree of deflection of the brushes 54. Common audio CD players may include even larger clearance distances (e.g., 1.2 mm), thereby resulting in an even lesser degree of deflection of the brushes 54.

Referring to FIGS. 6 and 7, the lens cleaner disc 50 is illustrated in two conditions occurring during its cleaning operation. In the illustrated embodiment, the laser lens 32 is shown having a clearance distance C that is relatively small (i.e., as found in a high definition video disc player). Even with a very small clearance distance C, the lens cleaner disc 50 is effective in cleaning the laser lens 32 with one or more brushes 54. When a brush 54 contacts the laser lens 32 (FIG. 7), the brush 54 deflects toward and into the associated recess 66. The brushes 54 can deflect any amount necessary up to a full deflection into the recess 66 (corresponding to a theoretical zero clearance distance C). The deflection of the brushes 54 into the recesses 66 allows for effective cleaning contact of the brushes 54 with the laser lens 32 without pinching the brushes 54 between the laser lens 32 and the first surface 58 of the disc 50, thereby reducing the amount of drag and/or jamming that might otherwise occur during cleaning operations, particularly in devices with particularly small clearance distances C. When used in devices with larger clearance distances, the brushes 54 may deflect only slightly towards the recesses 66, but still make effective cleaning contact with the laser lens 32. In this way, the lens cleaner disc 50 is capable of cleaning the lenses of media reading devices having a wide range of clearance distances C, such as standard definition and high definition DVD players, and audio disc players.

It should be understood that a large variety of alternatives and variations exist to the embodiments discussed above and illustrated in the drawings. The embodiments described above and illustrated in the figures are presented by way of example only and are not intended as a limitation upon the concepts and principles of the present invention. One of ordinary skill in the art will be able to recognize such alternatives and variations from the disclosure herein and, therefore, such alternatives and variations are within the spirit and scope of the present invention.

The invention claimed is:

1. A cleaning disc for a media reading device having a laser lens, the cleaning disc comprising:
   a disc body having a first surface and a second surface, the first surface facing the laser lens during a cleaning operation;

a brush coupled to the body, extending away from the first surface, and positioned to contact the laser lens during a cleaning operation; and a recess in the first surface behind the brush adapted to receive the brush into the recess when the brush deflects rearward as the brush contacts the laser lens.

2. The cleaning disc of claim 1, wherein the brush includes a base portion positioned within the recess, and ends that extend through the recess and beyond the first surface, and wherein a portion of the recess receives at least a portion of the ends when the brush deflects upon contact with the laser lens during the cleaning operation.

3. The cleaning disc of claim 1, wherein the brush is one of a plurality of brushes coupled to the body and extending away from the first surface, and wherein the recess is one of a plurality of recesses in the first surface, and wherein each recess includes a portion adapted to receive at least a portion of a respective one of the brushes when the respective one of the brushes deflects upon contact with the laser lens during the cleaning operation.

4. The cleaning disc of claim 3, wherein the portions of the recesses are arranged in a generally spiral array.

5. The cleaning disc of claim 3, wherein the cleaning disc defines a central axis, and wherein at least some of the portions of the recesses are located a different radial distance away from the central axis as others of the portions of the of recesses.

6. The cleaning disc of claim 3, wherein the cleaning disc defines a central axis, and wherein at least some of the portions of the recesses are circumferentially spaced apart from others of the portions of the recesses.

7. The cleaning disc of claim 1, wherein the recess is a first recess and the brush is a first brush, the cleaning disc further comprising:

a second brush coupled to the body spaced from the first brush, extending away from the first surface, and positioned to contact the laser lens during the cleaning operation, the second brush spaced from the first brush;

a second recess in the first surface behind the second brush adapted to receive the second brush into the second recess when the second brush deflects rearward as the second brush contacts the laser lens;

a length of material having first and second ends, wherein at least a portion of the first brush is defined by the first end of the length of strand material, and at least a portion of the second brush is defined by the second end of the length of material.

8. The cleaning disc of claim 7, wherein the second surface faces away from the laser lens during a cleaning operation, the body defining a first aperture extending through the second surface and opening into the first recess, and a second aperture extending through the second surface and opening into the second recess, wherein the first end of the length of material extends through the first aperture, the second end of the length of material extends through the second aperture, and wherein a middle portion of the length of material extends along the second surface between the first and second apertures.

9. The cleaning disc of claim 8, further comprising a cover attached to the second surface and overlying the middle portion of the length of strand material.

10. The cleaning disc of claim 1, further comprising information that is readable by the media reading device, the information including at least one of cleaning status information, audio instructions for a user, visual instruction for the user, instructions for the media reading device that control movement of the laser lens, and instructions for the media reading device that control rotation of the lens cleaner disc.

11. The cleaning disc of claim 1, wherein a majority of the recess trails the brush relative to a direction of rotation during the cleaning operation.

12. A cleaning disc for a media reading device having a laser lens, the cleaning disc comprising:

a first surface that faces the laser lens during a cleaning operation;

a second surface that faces away from the laser lens during the cleaning operation;

a first aperture extending through the disc;

a second aperture spaced from the first aperture and extending through the disc; and a length of strand material extending along the second surface and through the first and second apertures, the length of strand material including first and second ends, the first and second ends defining first and second cleaning brushes that extend away from the first surface for contact with the laser lens during a cleaning operation;

a first recess in the first surface, the first recess adapted to receive a portion of the first brush when the first brush contacts the laser lens during the cleaning operation; and a second recess in the first surface, the second recess adapted to receive a portion of the second brush when the second brush contacts the laser lens during the cleaning operation.

13. The cleaning disc of claim 12, wherein the first recess surrounds the first aperture and the second recess surrounds the second aperture.

14. The cleaning disc of claim 12, wherein the cleaning disc defines a central axis, and wherein the apertures are radially and circumferentially spaced apart from one another.

15. The cleaning disc of claim 12, further comprising a cover attached to the second surface and overlying the length of strand material.

16. A method of cleaning a laser lens of a media reading device, the method comprising:

inserting a cleaner disc into the media reading device, the cleaner disc including a brush protruding from the disc and a recess defined adjacent to the brush;

operating the media reading device to rotate the cleaner disc;

contacting the laser lens with the brush during rotation of the cleaner disc; and deflecting at least a portion of the brush into the recess in response to contacting the laser lens, wherein the cleaner disc includes:

a plurality of brushes and a plurality of recesses spaced about the disc, and wherein each recess is defined behind a respective one of the plurality of brushes so that the recess receives the respective brush into the recess when the brush deflects as it contacts the laser lens, the method further comprising:

sequentially and intermittently contacting the laser lens with the plurality of brushes.

17. The method of claim 16, wherein the plurality of brushes and recesses are arranged in a substantially spiral configuration, and wherein sequentially and intermittently contacting the laser lens includes sequentially and intermittently contacting different portions of the laser lens with each of the plurality of brushes.

* * * * *